(12) United States Patent
Hu et al.

(10) Patent No.: US 10,654,686 B2
(45) Date of Patent: May 19, 2020

(54) ELECTROMAGNETIC SAFETY TRIGGER

(71) Applicant: Otis Elevator Company, Farmington, CT (US)

(72) Inventors: Guohong Hu, Farmington, CT (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 57 days.

(21) Appl. No.: 15/179,281

(22) Filed: Jun. 10, 2016

(65) Prior Publication Data
US 2017/0001835 A1  Jan. 5, 2017

Related U.S. Application Data (60) Provisional application No. 62/186,635, filed on Jun. 30, 2015.

(51) Int. Cl.
*B66B 5/18* (2006.01)
*B66B 5/22* (2006.01)
*F16D 65/16* (2006.01)

(52) U.S. Cl.
CPC ............... *B66B 5/18* (2013.01); *B66B 5/22* (2013.01); *F16D 65/16* (2013.01)

(58) Field of Classification Search
CPC ... B66B 5/18; B66B 5/22; F16D 65/14; F16D 65/16
See application file for complete search history.

(56) References Cited

U.S. PATENT DOCUMENTS

| | | | |
|---|---|---|---|
| 6,161,653 A | 12/2000 | Skalski et al. | |
| 7,134,529 B2 | 11/2006 | Maury | |
| 7,299,898 B2 | 11/2007 | Husmann | |
| 7,398,863 B2 | 7/2008 | Liebetrau et al. | |
| 7,575,099 B2 | 8/2009 | Oh et al. | |
| 7,650,969 B2 * | 1/2010 | Monzon | B66B 5/0068 187/300 |
| 7,849,972 B2 | 12/2010 | Higashinaka | |
| 8,631,909 B2 | 1/2014 | Draper et al. | |
| 2007/0089938 A1 * | 4/2007 | Ishioka | B66B 5/18 187/391 |

(Continued)

FOREIGN PATENT DOCUMENTS

| | | |
|---|---|---|
| CN | 1083018 A | 3/1994 |
| CN | 102923547 A | 2/2013 |

(Continued)

OTHER PUBLICATIONS

European Patent Office, Extended European Search Report, dated Oct. 27, 2016.

(Continued)

*Primary Examiner* — Minh Truong
(74) *Attorney, Agent, or Firm* — Cantor Colburn LLP (57) ABSTRACT

The present disclosure relates generally to a selectively operable safety brake including a magnetic brake operably coupled to a rod and disposed adjacent to a metal component, the magnetic brake configured to move between an engaging position and a non-engaging position, said magnetic brake, when in the engaging position contemporaneously with motion of the machine, moving the rod in to thereby move the safety brake from the non-braking state into the braking state, and an electromagnetic component including a retention apparatus, the electromagnetic component configured to move the magnetic brake from the engaging position to the non-engaging position upon receipt of a resetting signal.

16 Claims, 6 Drawing Sheets

(56) References Cited

U.S. PATENT DOCUMENTS

| | | | |
|---|---|---|---|
| 2007/0181378 A1* | 8/2007 | Kigawa | B66B 5/044 187/376 |
| 2007/0272503 A1* | 11/2007 | Kigawa | B66B 5/18 187/379 |
| 2011/0088983 A1 | 4/2011 | Sirigu et al. | |
| 2012/0152659 A1 | 6/2012 | Husmann et al. | |
| 2012/0152663 A1 | 6/2012 | Legeret et al. | |
| 2013/0043097 A1 | 2/2013 | Widmer | |
| 2014/0326544 A1 | 11/2014 | Husmann | |
| 2015/0259175 A1* | 9/2015 | West | B66B 5/18 187/359 |

FOREIGN PATENT DOCUMENTS

| | | |
|---|---|---|
| EP | 1813566 A1 | 1/2007 |
| EP | 2258650 B1 | 8/2012 |
| WO | 2000039016 A1 | 7/2000 |
| WO | 2011146073 A1 | 11/2011 |
| WO | 2013070234 A1 | 5/2013 |
| WO | 2015047391 A1 | 4/2015 |
| WO | 2017087978 A1 | 5/2017 |
| WO | 2017098299 A1 | 6/2017 |

OTHER PUBLICATIONS

Chinese Office Action for application CN 201610509130.7, dated Feb. 1, 2019, 7 pages.
European Office Action for application EP 16177329.6, dated Jan. 23, 2019, 7 pages.
European Search Report for application EP 19167273.2, dated Jan. 8, 2020, 78 pages.

* cited by examiner

ELECTROMAGNETIC SAFETY TRIGGER

CROSS REFERENCE TO RELATED APPLICATIONS

The present application is related to, and claims the priority benefit of, U.S. Provisional Patent Application Ser. No. 62/186,635 filed Jun. 30, 2015, the contents of which are hereby incorporated in their entirety into the present disclosure.

TECHNICAL FIELD OF THE DISCLOSED EMBODIMENTS

The present disclosure is generally related to braking and/or safety systems and, more specifically, an electromagnetic safety trigger.

BACKGROUND OF THE DISCLOSED EMBODIMENTS

Some machines, such as an elevator system, include a safety system to stop the machine when it rotates or travels at excessive speeds in response to an inoperative component. Generally, a traditional safety system includes a significant number of components that are required to effectively operate the system. These additional components increase installation time and costs. There is therefore a need for a safety system that reduces the number of components and is cost effective.

SUMMARY OF THE DISCLOSED EMBODIMENTS

In one aspect, selectively operable braking device for an elevator system is provided. The selectively operable braking device includes a safety brake disposed on the car and adapted to be wedged against one of the guiderails when moved from a non-braking state into a braking state, a rod operably coupled to the safety brake, the rod configured to move the safety brake between the non-breaking state and braking state, a magnetic brake operably coupled to the rod and disposed adjacent to the guiderail, the magnetic brake configured to move between a rail-engaging position and a rail-non-engaging position, said magnetic brake, when in the rail-engaging position contemporaneously with motion of the car, moving the rod in a direction to thereby move the safety brake from the non-braking state into the braking state, and an electromagnetic component, the electromagnetic component configured to move the magnetic brake from the rail-engaging position to the rail-non-engaging position upon receipt of a resetting signal.

In an embodiment, the selectively operable braking device further includes a safety controller in electrical communication with the electromagnetic component, the safety controller configured to send a trigger signal and the resetting signal, wherein the electromagnetic component is configured to move the magnetic brake to the rail-engaging position upon receipt of the trigger signal. In any of the preceding embodiments, the electromagnetic component is configured to hold the magnetic brake in the rail-non-engaging position.

In any of the preceding embodiments, the electromagnetic component further includes a retention apparatus. In an embodiment, the retention apparatus comprises a housing wall, wherein in some embodiments, the retention apparatus further includes a spring configured to move the electromagnetic component in a direction parallel to an actuation axis. In further embodiments, the retention apparatus further includes a spring configured to move the electromagnetic component in a direction parallel to an actuation axis. In another embodiment, the retention apparatus is configured to return the magnetic brake, the electromagnetic component, or both, to the rail-non-engaging position when the electromagnetic component and the magnetic brake are fully engaged.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
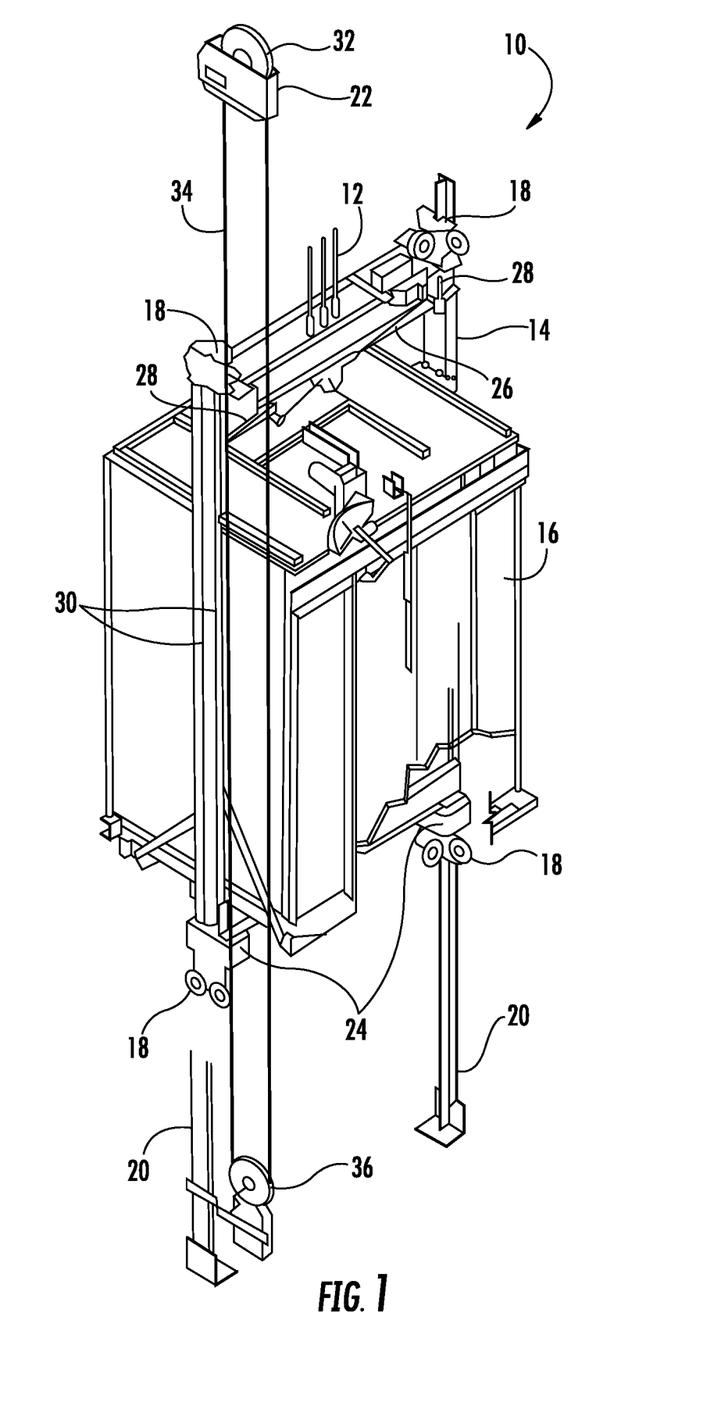
FIG. 1 is a schematic diagram of an elevator system employing a mechanical governor.

FIG. 1 shows an elevator system, generally indicated at 10. The elevator system 10 includes cables 12, a car frame 14, a car 16, roller guides 18, guide rails 20, a governor 22, safeties 24, linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Car 16, which is attached to car frame 14, moves up and down the hoistway by force transmitted through cables 12 to car frame 14 by an elevator drive (not shown) commonly located in a machine room at the top of the hoistway. Roller guides 18 are attached to car frame 14 to guide the car 16 up and down the hoistway along guide rail 20. Governor sheave 32 is mounted at an upper end of the hoistway. Rope loop 34 is wrapped partially around governor sheave 32 and partially around tensioning sheave 36 (located in this embodiment at a bottom end of the hoistway). Rope loop 34 is also connected to elevator car 16 at lever 28, ensuring that the angular velocity of governor sheave 32 is directly related to the speed of elevator car 16

In the elevator system 10 shown in FIG. 1, governor 22, an electromechanical brake (not shown) located in the machine room, and safeties 24 act to stop elevator car 16 if car 16 exceeds a set speed as it travels inside the hoistway. If car 16 reaches an over-speed condition, governor 22 is triggered initially to engage a switch, which in turn cuts power to the elevator drive and drops the brake to arrest movement of the drive sheave and thereby arrest movement of car 16. If, however, cables 12 break or car 16 otherwise experiences a free-fall condition unaffected by the brake, governor 22 may then act to trigger safeties 24 to arrest movement of car 16. In addition to engaging a switch to drop the brake, governor 22 also releases a clutching device that grips the governor rope 34. Governor rope 34 is connected to safeties 24 through mechanical linkages 26, levers 28, and lift rods 30. As car 16 continues its descent unaffected by the brake, governor rope 34, which is now prevented from moving by actuated governor 22, pulls on operating lever 28. Operating lever 28 "sets" safeties 24 by moving linkages 26 connected to lift rods 30, which lift rods 30 cause safeties 24 to engage guide rails 20 to bring car 16 to a stop.

Figure 2:
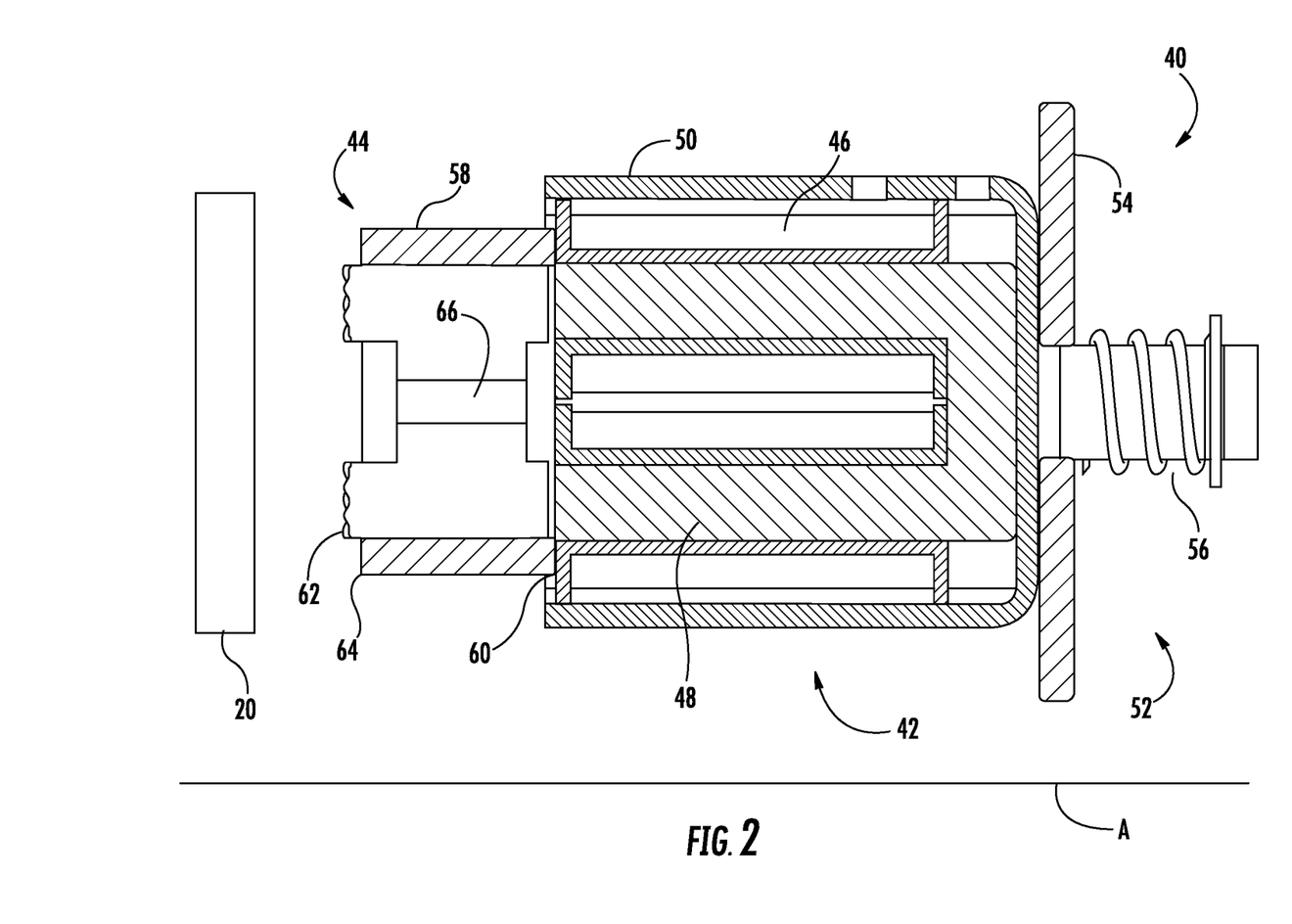
FIG. 2 is a cross-sectional view of an electromagnetic safety trigger in a non-braking state according to an embodiment of the present disclosure.

FIG. 2 shows an embodiment of an electromagnetic safety trigger 40 for an elevator safety system in a normal operating state. The electromagnetic safety trigger 40 includes an electromagnetic component 42 and a magnetic brake 44. The electromagnetic component 42 includes a coil 46 and a core 48 disposed within a housing 50. The electromagnetic component 42 further includes a retention apparatus 52. In the embodiment shown, the retention apparatus 52 includes a housing wall 54 and at least one resetting spring 56. The at least one resetting spring 56 is configured to move the electromagnetic component 42 in a direction parallel to the axis A. In an embodiment, the housing wall 54 may be flexible and configured to move the electromagnetic component 42 in a direction parallel to the axis A. In such an embodiment, the at least one resetting spring 56 may not be required. The magnetic brake 44 includes a holder 58 having a first end 60 and a brake portion 62 disposed on a second end 64. A magnet 66 is disposed within the holder 58, and configured to magnetically couple the magnetic brake 44 to the electromagnetic component 42 in a non-engaging position and to a metal component of the system (e.g. the guide rails 20) in an engaging position.

For example, in the non-engaging position, the magnetic brake 44 is attracted and held to the electromagnetic component 42 via the core 48. The at least one resetting spring 56 is operative to hold the electromagnetic component 42 in normal operating state (i.e. non-engaging position). The at least one resetting spring 56 includes a preset tension such that the attraction force between the magnetic brake 44 and the guide rails 20 is far less than the holding force provided by the at least one resetting spring 56.

Figure 3:
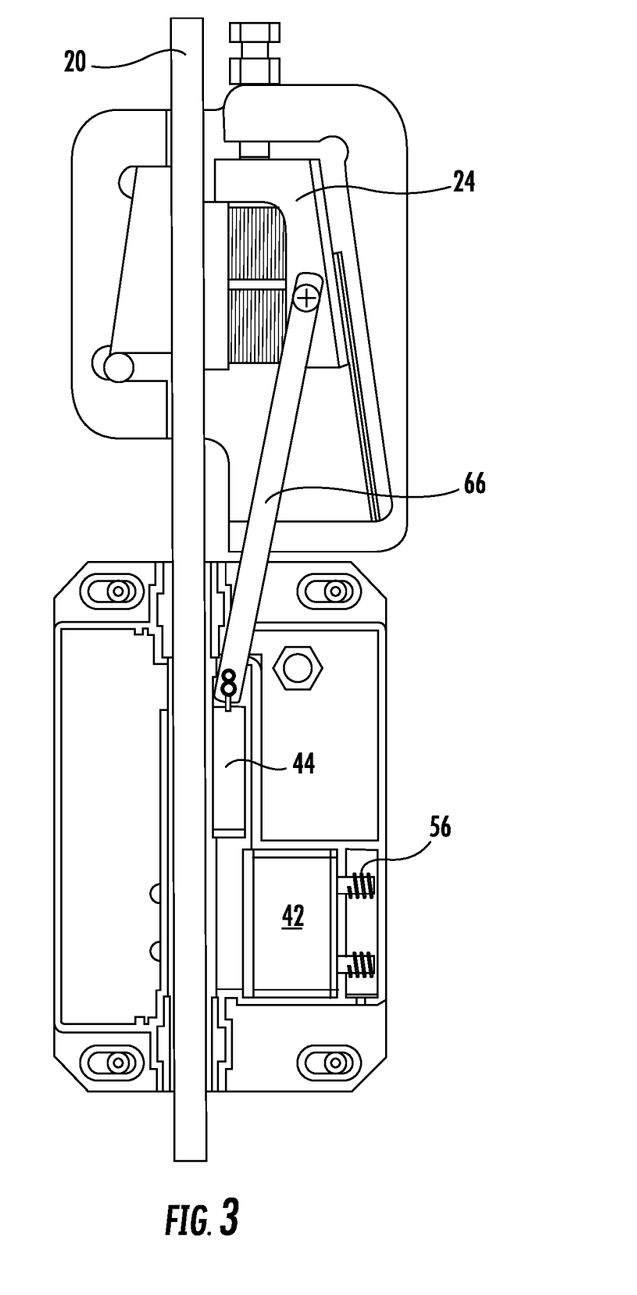
FIG. 3 is a side view of the electromagnetic safety trigger in a braking state according to an embodiment of the present disclosure.
Figure 4:
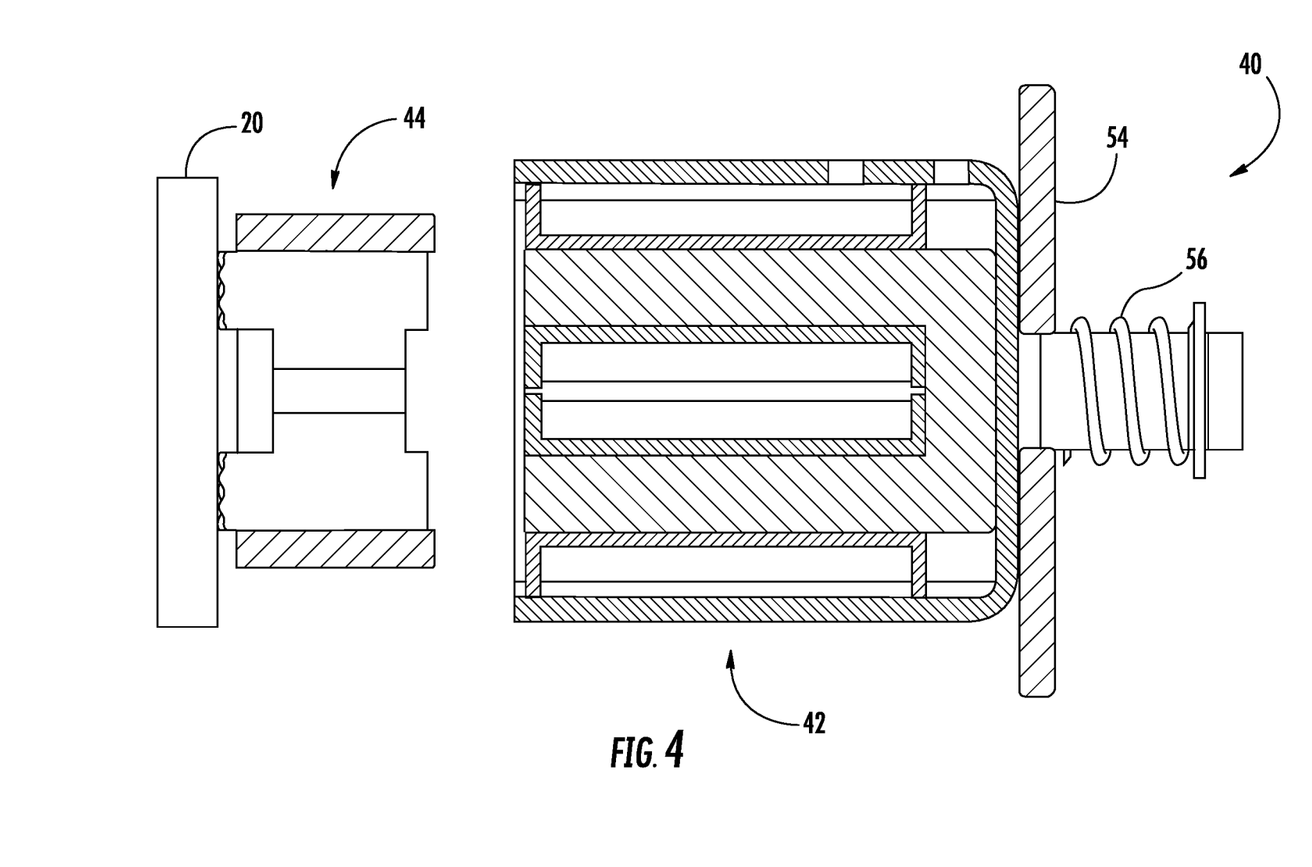
FIG. 4 is a cross-sectional view of the electromagnetic safety trigger at the braking position and is in an actuated state according to an embodiment of the present disclosure.

In the event of an overspeed condition of elevator car 16 in the down direction, the electromagnetic component 42 propels the magnetic brake 44 towards the guide rail 20 as shown in FIGS. 3 and 4. As a result, the safety 24 is pushed in an upward direction by a small linkage bar 66 operably coupled to the safety 24 and the magnetic brake 44 when relative motion is created by the magnetic brake 44 sticking to the guide rail 20.

Figure 5:
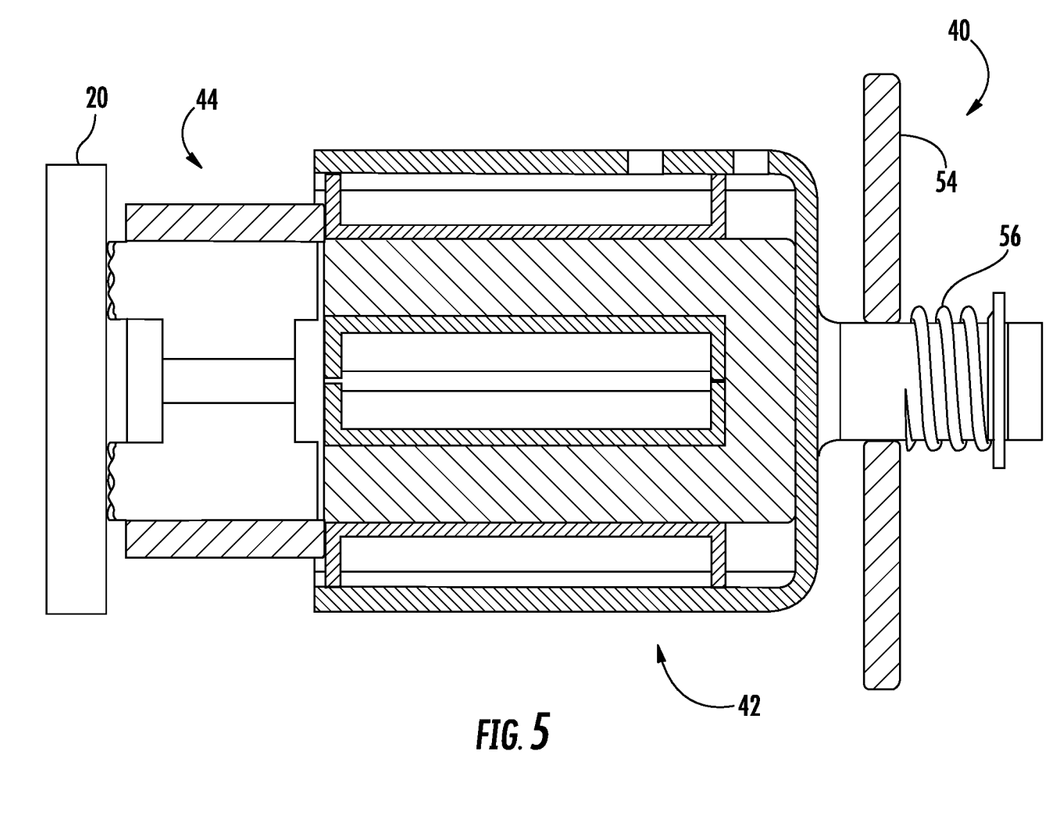
FIG. 5 is a cross-sectional view of the electromagnetic safety trigger at the braking position and is in the state transition from a braking state to a non-braking state according to an embodiment of the present disclosure.

FIG. 5 shows the electromagnetic safety trigger 40 in a transition state from a braking state to a non-braking state. After the car 16 has come to a stop, the car 16 is moved in the opposite direction of travel until the magnetic brake 44 and the electromagnetic component 42 are substantially aligned. A reverse current energizes the electromagnetic component 42 such that the electromagnetic component 42 overcomes the spring force of the at least one resetting spring 56 and moves towards the magnetic brake 44. When the electromagnetic component 42 and the magnetic brake 44 are fully engaged, the magnetic force between the magnetic brake 44 and the rail 20 is significantly reduced due to the change of magnetic circuit. As such, the force created by the at least one resetting spring 56 is able to pull the magnetic brake 44 and electromagnetic component 42 together to return to the normal operating state (i.e. the non-engaging position, see FIG. 2).

While the embodiment of the electromagnetic safety trigger 40 is shown in use with an elevator system 10, it will be appreciated that the electromagnetic safety trigger 40 may be suitable for any large stroke range application, such as a rotary arrangement and linear arrangement machines to name a couple of non-limiting example.

Figure 6:
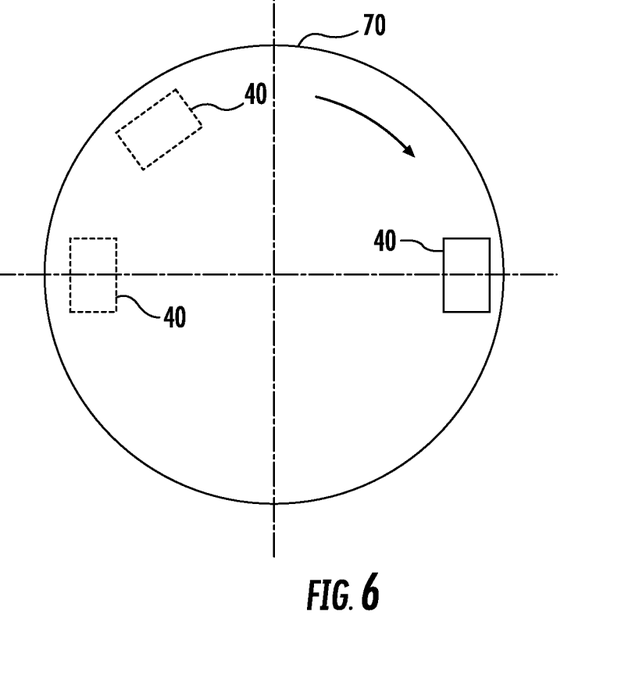
FIG. 6 is front view of a rotary arrangement machine according to an embodiment of the present disclosure.
Figure 7:
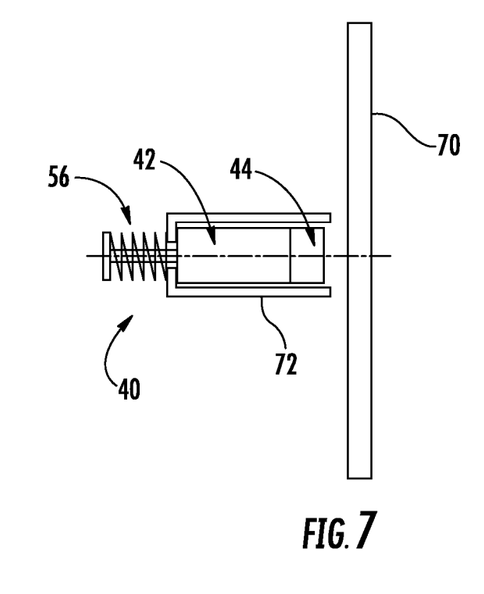
FIG. 7 is a cross-sectional view of an electromagnetic safety trigger according to an embodiment of the present disclosure.
Figure 8:
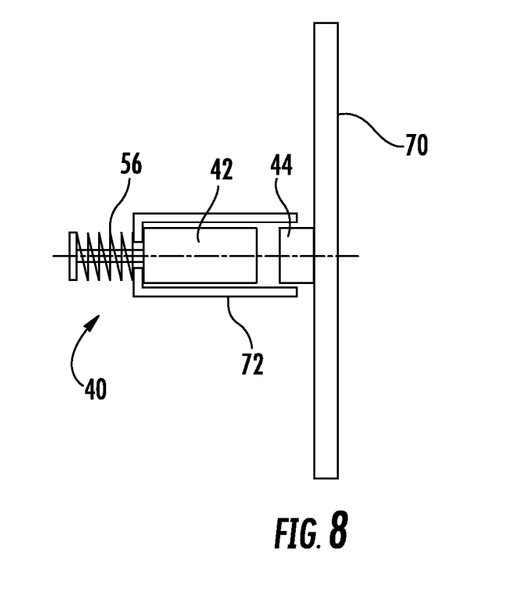
FIG. 8 is a cross-sectional view of an electromagnetic safety trigger in a braking state according to an embodiment of the present disclosure.

For example, FIGS. 6-8 show the electromagnetic safety trigger 40 with a rotary arrangement machine 70. One or more electromagnetic safety triggers 40 are shown disposed within a stationary housing, and located adjacent to the rotary arrangement machine 70. As the magnetic brake 44 is propelled to fully engage the rotary arrangement machine 70, as shown in FIG. 8, a portion of the magnetic brake 44 remains within the stationary housing 72 to arrest rotation of the rotary arrangement machine 70.

It will therefore be appreciated that the present embodiments include an electromagnetic safety trigger 40 having a retention apparatus 52 capable of generating enough force to disengage the magnetic brake 44 from a metal component of the system during a reset condition.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A selectively operable braking device for an elevator system including a car and a plurality of guiderails, comprising:
    a safety brake disposed on the car and adapted to be wedged against one of the guiderails when moved from a non-braking state into a braking state;
    a rod operably coupled to the safety brake, the rod configured to move the safety brake between the non-braking state and braking state;
    a magnetic brake operably coupled to the rod and disposed adjacent to the guiderail, the magnetic brake configured to move between a rail-engaging position and a rail-non-engaging position, said magnetic brake, when in the rail-engaging position contemporaneously with motion of the car, moving the rod in a direction to thereby move the safety brake from the non-braking state into the braking state;
    an electromagnetic component, the electromagnetic component configured to move the magnetic brake from the rail-engaging position to the rail-non-engaging position upon receipt of a resetting signal; and wherein the magnetic brake is configured to de-couple from the electromagnetic component when in the rail-engaging position;

wherein the magnetic brake includes a magnet and the electromagnetic component includes a coil, the magnetic brake is attracted to or repelled from the electromagnetic component in response to a presence or absence of current in the coil, the magnet magnetically coupled to the guiderail in the rail-engaging position;

wherein the rod has a first end connected to the safety brake and a second end connected to the magnetic brake.

2. The braking device of claim 1 further comprising:

a safety controller in electrical communication with the electromagnetic component, the safety controller configured to send a trigger signal and the resetting signal.

3. The braking device of claim 2, wherein the electromagnetic component is configured to move the magnetic brake to the rail-engaging position upon receipt of the trigger signal.

4. The braking device of claim 1, wherein the electromagnetic component is configured to hold the magnetic brake in the rail-non-engaging position.

5. The braking device of claim 4, wherein the retention apparatus further comprises a spring configured to move the electromagnetic component in a direction parallel to an actuation axis.

6. The braking device of claim 1, wherein the electromagnetic component further comprises a retention apparatus.

7. The braking device of claim 6, wherein the retention apparatus comprises a housing wall.

8. The braking device of claim 6, wherein the retention apparatus is configured to return the magnetic brake to the rail-non-engaging position when the electromagnetic component is engaged with the magnetic brake in response to a current in the coil.

9. A selectively operable magnetic braking system comprising:

a safety brake disposed on a machine and adapted to arrest movement of the machine when moved from a non-braking state into a braking state;

a rod operably coupled to the safety brake, the rod configured to move the safety brake between the non-braking state and braking state;

a magnetic brake disposed adjacent to the machine, the magnetic brake configured to move between an engaging position and a non-engaging position, said magnetic brake, when in the engaging position contemporaneously with motion of the machine, moving to thereby move the safety brake from the non-braking state into the braking state; and an electromagnetic component configured to move the magnetic brake from the engaging position to the non-engaging position upon receipt of a resetting signal and configured to de-couple from the magnetic brake when in the rail-engaging position;

wherein the magnetic brake includes a magnet and the electromagnetic component includes a coil, the magnetic brake is attracted to or repelled from the electromagnetic component in response to a presence or absence of current in the coil, the magnet magnetically coupled to the guiderail in the rail-engaging position;

wherein the rod has a first end connected to the safety brake and a second end connected to the magnetic brake.

10. The magnetic braking system of claim 9 further comprising:

a safety controller in electrical communication with the electromagnetic component, the safety controller configured to send a trigger signal and the resetting signal.

11. The magnetic braking system of claim 9, wherein the electromagnetic component is configured to move the magnetic brake to the engaging position upon receipt of a trigger signal.

12. The magnetic braking system of claim 9, wherein the electromagnetic component is configured to hold the magnetic brake in the non-engaging position.

13. The magnetic braking system of claim 9, wherein the electromagnetic component further comprises a retention apparatus.

14. The magnetic braking system of claim 13, wherein the retention apparatus comprises a housing wall.

15. The magnetic braking system of claim 13, wherein the retention apparatus further comprises a spring configured to move the electromagnetic component in a direction parallel to an actuation axis.

16. The magnetic braking system of claim 13, wherein the retention apparatus is configured to return the magnetic brake to the non-engaging position when the electromagnetic component is engaged with the magnetic brake in response to a current in the coil.

* * * * *